United States Patent
Saito et al.

(10) Patent No.: US 8,447,484 B2
(45) Date of Patent: May 21, 2013

(54) BRANCH-LANE ENTRY JUDGING SYSTEM

(75) Inventors: Toru Saito, Tokyo (JP); Tasuku Maruyama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1361 days.

(21) Appl. No.: 12/141,975

(22) Filed: Jun. 19, 2008

(65) Prior Publication Data
US 2009/0157286 A1 Jun. 18, 2009

(30) Foreign Application Priority Data
Jun. 22, 2007 (JP) .................... 2007-165448

(51) Int. Cl.
- G06F 7/70 (2006.01)
- G06F 19/00 (2011.01)
- G06G 7/00 (2006.01)
- G06G 7/76 (2006.01)

(52) U.S. Cl.
USPC .............................. 701/70; 701/93; 382/184

(58) Field of Classification Search
USPC .............. 701/117, 208, 301, 302, 36, 41, 70, 701/93, 300; 382/104–107, 121, 171, 172, 382/184; 180/169–179; 340/901
See application file for complete search history.

(56) References Cited

U.S. PATENT DOCUMENTS

| | | | |
|---|---|---|---|
| 6,577,334 B1 * | 6/2003 | Kawai et al. | 348/148 |
| 7,725,261 B2 * | 5/2010 | Sekiguchi | 701/301 |
| 2001/0056326 A1 * | 12/2001 | Kimura | 701/208 |
| 2003/0187578 A1 * | 10/2003 | Nishira et al. | 701/301 |
| 2003/0204299 A1 * | 10/2003 | Waldis et al. | 701/96 |
| 2005/0125121 A1 * | 6/2005 | Isaji et al. | 701/36 |
| 2006/0239509 A1 * | 10/2006 | Saito | 382/104 |

FOREIGN PATENT DOCUMENTS

| | | |
|---|---|---|
| JP | 5-114099 | 5/1993 |
| JP | 10-283461 | 10/1998 |
| JP | 10-283477 | 10/1998 |
| JP | 2004-341941 | 12/2004 |
| JP | 2005-001566 | 1/2005 |
| JP | 2005-004442 | 1/2005 |
| JP | 2006-331389 | 12/2006 |
| WO | 2004/111974 | 12/2004 |

\* cited by examiner

*Primary Examiner* — Jeffrey Shapiro
(74) *Attorney, Agent, or Firm* — Smith, Gambrell & Russell, LLP

(57) ABSTRACT

A branch-lane entry judging system includes a traffic-line detecting means for detecting traffic lines on right and left sides of a vehicle, a length and width detecting means for detecting lengths and widths of the traffic lines in a real space, a lane-type judging means for judging types of the traffic lines and a type of a lane in which the vehicle is running, a branch-lane detecting means for detecting a branch lane when one of the traffic lines changes from a solid line to a broken line having a predetermined length and a predetermined width, the branch lane existing near the changed traffic line, and a branch-lane entry judging means for judging that the vehicle will enter the branch lane when the vehicle moves toward the branch lane or a directional indicator is operated toward the branch lane while the branch lane is detected.

23 Claims, 14 Drawing Sheets

US 8,447,484 B2

BRANCH-LANE ENTRY JUDGING SYSTEM

CROSS-REFERENCE TO RELATED APPLICATION

The disclosure of Japanese Patent Application No. 2007-165448 filed on Jun. 22, 2007 including the specification, drawings and abstract is incorporated herein by reference in its entirety.

BACKGROUND OF THE INVENTION

1. Field of the Invention

The present invention relates to branch-lane entry judging systems, and more particularly, to a branch-lane entry judging system that recognizes a branch lane by detecting traffic lines around a vehicle in which the branch-lane entry judging system is mounted and that judges whether the vehicle will enter the branch lane.

2. Description of the Related Art

In recent years, cruise control systems and adaptive cruise control (hereinafter abbreviated as ACC) systems have been developed. A cruise control system recognizes road conditions in front of and around a vehicle, and a preceding vehicle according to the result of analysis of an image taken by an image-taking device, such as a stereo camera or a monocular camera, or the result of measurement made by a radar device such as an infrared laser radar or a millimeter-wave radar. On the basis of the recognition result, the cruise control system performs constant-speed running control on the vehicle. An ACC system performs not only constant-speed running control on the vehicle, but also adaptive cruise control with a preceding-vehicle follow function of controlling the running of the vehicle following the preceding vehicle (for example, see Japanese Unexamined Patent Application Publication No. 2005-1566).

The ACC system normally causes the vehicle to run at a preset constant speed. When there is a preceding vehicle, the ACC system automatically and properly controls an accelerator throttle and a brake mechanism of the vehicle so that the vehicle follows the preceding vehicle.

When the vehicle enters a branch lane on the right or left side of a road such as an expressway, a freeway, or an ordinary road, it normally needs to be decelerated. However, while the ACC system stays in operation, the vehicle continues constant-speed running. For this reason, it is necessary for the driver to stop the cruise control function, for example, by performing hard braking or manually stopping the ACC system.

In order to cope with this problem, a branch-lane entry estimating apparatus disclosed in Japanese Unexamined Patent Application Publication No. 2004-341941 estimates whether the vehicle is running near a branch point on the road according to map information from a navigation system, and detects stationary objects existing on the roadside, for example, delineators and guardrails. On the basis of the positional relationship with the objects, it is judged whether the vehicle is in a branch lane or whether the vehicle is likely to enter the branch lane.

Unfortunately, a stationary object, such as a delineator or a guardrail, is not always provided in every branch lane. Moreover, the positional relationship, such as the distance between a lane defined by traffic lines shown by continuous lines or broken lines on the road and the stationary object, is not always fixed. Therefore, it is not always easy to precisely specify the number and positions of lanes on the basis of the stationary object. Further, the above-described estimation is not properly performed if a rod-shaped stationary object standing up from the road surface, such as a delineator, is not detected accurately. For this reason, the above-described branch-lane entry estimating apparatus can be used only in a road environment that is ideal for the apparatus. If the apparatus is used in an unsuitable environment, an incorrect estimation may be made.

In the present invention, continuous lines and broken lines marked on the road surface, for example, a road center line such as a no-passing line, a vehicle-lane boundary line, and a separating line for separating a side strip and a roadway, are referred to as traffic lines. Further, a traffic line that is marked, for example, at a branch point on the expressway, as shown in FIG. 5 that will be described below, and that is wider and shorter than a normal traffic line is referred to as a block line.

For example, when the vehicle enters a branch lane at the entrance of a parking area or at an interchange during running on the expressway, it is necessary to relatively quickly change the running state of the vehicle, for example, by hard braking. Therefore, control different from control for running in a normal lane is required. Similar control is necessary not only in the expressway, but also in a branch lane from a bypass of a national road to an ordinary road and a branch lane from an ordinary road to a side road.

For that purpose, such an apparatus is first required to accurately detect the existence of a branch lane, and to accurately judge whether the vehicle will enter the detected branch lane.

SUMMARY OF THE INVENTION

The present invention has been made in view of these circumstances, and an object of the invention is to provide a branch-lane entry judging system that accurately detects the existence of a branch lane and accurately judges that a vehicle in which the system is mounted will enter the detected branch lane.

In order to solve the above-described problems, a branch-lane entry judging system according to an aspect of the present invention includes a traffic-line detecting means configured to detect traffic lines on right and left sides of a vehicle; a length and width detecting means configured to detect lengths and widths in a traveling direction of the vehicle on a real space of the traffic lines detected by the traffic-line detecting means; a lane-type judging means configured to judge types of the traffic lines and judge a type of a lane in which the vehicle is running, on the basis of a result of detection performed by the length and width detecting means; a branch-lane detecting means configured to detect the existence of a branch lane when detecting, on the basis of the result of detection performed by the length and width detecting means, that one of the traffic lines changes from a solid line to a broken line having a predetermined length and a predetermined width, the branch lane existing near the changed traffic line; and a branch-lane entry judging means configured to judge that the vehicle will enter the branch lane when the vehicle moves toward the branch lane or a directional indicator is operated toward the branch lane while the branch-lane detecting means is detecting the branch lane.

In this case, the types of traffic lines on the right and left sides of the vehicle are judged by detecting the lengths and widths of the traffic lines. When one of the traffic lines changes from a solid line to a block line, it is detected that a branch lane exists near the changed traffic line. This allows accurate detection of the existence of the branch lane. After the existence of the branch lane is accurately detected, it is judged that the vehicle will enter the branch lane when the vehicle moves toward the branch lane or the directional indicator is operated toward the branch lane. Therefore, it is possible to accurately judge whether the vehicle will enter the branch lane.

Since it is possible to accurately detect the branch lane and to accurately judge the entry in the branch lane, as described above, for example, acceleration of the vehicle can be properly prohibited, and the vehicle can be properly decelerated in a ramp or the like. This allows stable running of the vehicle, and improves running safety of the vehicle.

The branch-lane entry judging system may further include a history holding means configured to hold a history showing that the broken line having the predetermined length and the predetermined width was detected as a solid line in the previous sampling period. With reference to the history held by the history holding means, it is judged that the one of the traffic lines changes from the solid line to the broken line.

For example, the history holding means is formed by a counter that increments a count value serving as the history or sets the count value at a fixed value while one of the traffic lines on the right and left sides of the vehicle is a solid line, and that decrements the count value when the one of the traffic line is detected as a block line. While a predetermined count value is held in the history holding means, it is possible to provide a history showing that the traffic line currently detected as a block line was detected as a solid line previously. Therefore, it is possible to reliably detect that the traffic line has changed from the solid line to the block line. As a result, the branch lane can be detected while ensuring that the traffic line has changed from the solid line to the block line, and the above-described advantages of the branch-lane entry judging system can be achieved more accurately.

Preferably, an acceleration-prohibiting signal for prohibiting acceleration of the vehicle is output when the branch-lane entry judging means that the vehicle will enter the branch lane.

In this case, when it is judged that the vehicle will enter the branch lane, a signal for prohibiting acceleration of the vehicle is output. Consequently, in addition to the above-described advantages, unnecessary acceleration can be prohibited in a branch lane at the entrance of a ramp where deceleration is normally required, and deceleration can be properly and stably started. For this reason, running safety of the vehicle can be improved.

Preferably, a deceleration signal for decelerating the vehicle is output when the length and width detecting means detects that both the traffic lines on the right and left sides of the vehicle have changed to solid lines while a predetermined time passes or while the vehicle runs by a predetermined distance after the branch-lane entry judging means judges that the vehicle will enter the branch lane.

When both the right and left traffic lines become solid lines after the vehicle enters the branch lane, it is judged that there is a high possibility that the vehicle entered a ramp. By outputting the deceleration signal so as to positively decelerate the vehicle in this case, the vehicle can be properly decelerated and running safety of the vehicle can be improved, in addition to the above-described advantages.

Preferably, the output of the deceleration signal is stopped when at least one of the traffic lines on the right and left sides of the vehicle is not detected by the length and width detecting means after the output of the deceleration signal starts.

When at least one of the traffic lines on the right and left sides of the vehicle is not detected after the vehicle enters the branch lane and both the traffic lines become solid lines, there is a high possibility that the vehicle has reached a parking area, a tollgate, or the exit of an interchange. In this case, it is better that the driver properly steer the vehicle so as not to collide with a preceding vehicle or the like, without decelerating the vehicle by the branch-lane entry judging system. For this reason, when there is a high possibility that the vehicle has reached the parking area or the like, control for decelerating the vehicle is stopped and the driver is urged to steer the vehicle. Running safety of the vehicle can be thereby improved, in addition to the above-described advantages.

Preferably, the output of the deceleration signal is stopped when a predetermined time passes, the vehicle runs by a predetermined distance, or a speed of the vehicle falls below a predetermined speed after the output of the deceleration signal starts.

When a predetermined time passes, the vehicle runs by a predetermined distance, or the speed of the vehicle falls below a predetermined speed after the output of the deceleration signal starts, it is conceivable that the vehicle has been decelerated sufficiently. For this reason, the output of the deceleration signal is stopped in this case. Consequently, the driver can properly perform steering in accordance with the circumstance and running safety of the vehicle can be improved, in addition to the above-described advantages.

Preferably, a signal for stopping constant-speed running control on the vehicle is output when the output of the deceleration signal is stopped.

When the vehicle reaches the parking area or the like or when the vehicle is sufficiently decelerated, the driver can properly perform steering in accordance with the circumstance by stopping the above-described ACC control, particularly, constant-speed running control on the vehicle, and the above-described advantages can be achieved more effectively.

Preferably, the output of the deceleration signal is stopped when a curvature of a road becomes more than or equal to a predetermined curvature after the length and width detecting means detects that both the traffic lines on the right and left sides of the vehicle have changed to the solid lines.

When both the right and left traffic lines become solid lines and the vehicle enters a ramp, the ramp is sometimes curved sharply. In this case, for example, when the vehicle is provided with a curve restraint mechanism that automatically controls the accelerator throttle and brake mechanism of the vehicle so as to optimally perform deceleration, it is preferable to stop the output of the deceleration signal and to entrust the curve restraint mechanism with control. By thus entrusting the mechanism capable of more proper control, the above-described advantages can be achieved more effectively.

Preferably, the output of the acceleration-prohibiting signal is stopped when the length and width detecting means detects that the one of the traffic lines is the broken line having the predetermined length and the predetermined width while a predetermined time passes or the vehicle runs by a predetermined distance after the branch-lane entry judging means judges that the vehicle will enter the branch lane.

Even when it is judged that the vehicle has entered the branch lane across the block line, the lane the vehicle entered is sometimes not a branch lane, but a slower lane. In a slower lane, it is unnecessary to prohibit acceleration of the vehicle. For this reason, when the traffic line on the right or left side of the vehicle remains a block line after the vehicle enters the branch lane, it is judged that there is a high possibility that the vehicle is running not in a branch lane, but in a slower lane, and the output of the acceleration-prohibiting signal is stopped. This allows the vehicle to properly run, and more effectively achieves the above-described advantages.

A signal for returning to constant-speed running control on the vehicle may be output when the output of the deceleration signal or the acceleration-prohibiting signal is stopped.

When the curve of the ramp is sharp or there is a high possibility that the vehicle is running in a slower lane, a signal for returning to constant-speed running control on the vehicle is output to return to ACC control when the output of the acceleration-prohibiting signal or the deceleration signal is stopped. This allows running of the vehicle to be more properly controlled, and more effectively achieves the above-described advantages.

The branch-lane entry judging system may further include a preceding-vehicle detecting means configured to detect a preceding vehicle. When the acceleration-prohibiting signal or the deceleration signal is output, a deceleration calculated from a speed of the preceding vehicle and a distance between the vehicle and the preceding vehicle detected by the preceding-vehicle detecting means is output. The output deceleration and a deceleration based on the acceleration-prohibiting signal or the deceleration signal are compared, and control is performed while giving priority to one of the decelerations having a larger absolute value.

When the vehicle includes the preceding-vehicle detecting means for detecting a preceding vehicle, it is decelerated according to two standards, that is, a standard based on the deceleration signal and a standard based on information about the speed of the preceding vehicle and the distance between the preceding vehicle and the vehicle. In this case, both decelerations are compared, and control is performed while giving priority to the deceleration having a larger absolute value, that is, the deceleration for stronger deceleration. This reliably prevents a collision with the preceding vehicle, and more effectively achieves the above-described advantages.

The branch-lane entry judging system may further include a preceding-vehicle detecting means configured to detect a preceding vehicle. When the preceding vehicle is detected by the preceding-vehicle detecting means, a signal for returning to preceding-vehicle follow control so that the vehicle follows the preceding vehicle is output.

When the vehicle includes the preceding-vehicle detecting means for detecting a preceding vehicle, priority is given to ACC control, particularly, preceding-vehicle follow control on the control according to the present invention. This reliably prevents a collision with the preceding vehicle, and more effectively achieves the above-described advantages.

Preferably, when the directional indicator is operated in a direction opposite the branch lane, a signal for returning to constant-speed running control on the vehicle is output.

When the driver operates the directional indicator in a direction opposite the branch lane, control is returned to ACC control by the ACC device, particularly, preceding-vehicle follow control. In this case, when the driver erroneously causes the vehicle to enter the branch lane or returns the vehicle from a slower lane into an ordinary lane, control, for example, prohibition of acceleration of the vehicle, can be properly stopped, and ACC control can be properly restarted. Therefore, the above-described advantages are achieved more effectively.

DESCRIPTION OF THE PREFERRED EMBODIMENT

A branch-lane entry judging system according to an embodiment of the present invention will be described below with reference to the drawings.

Figure 1:
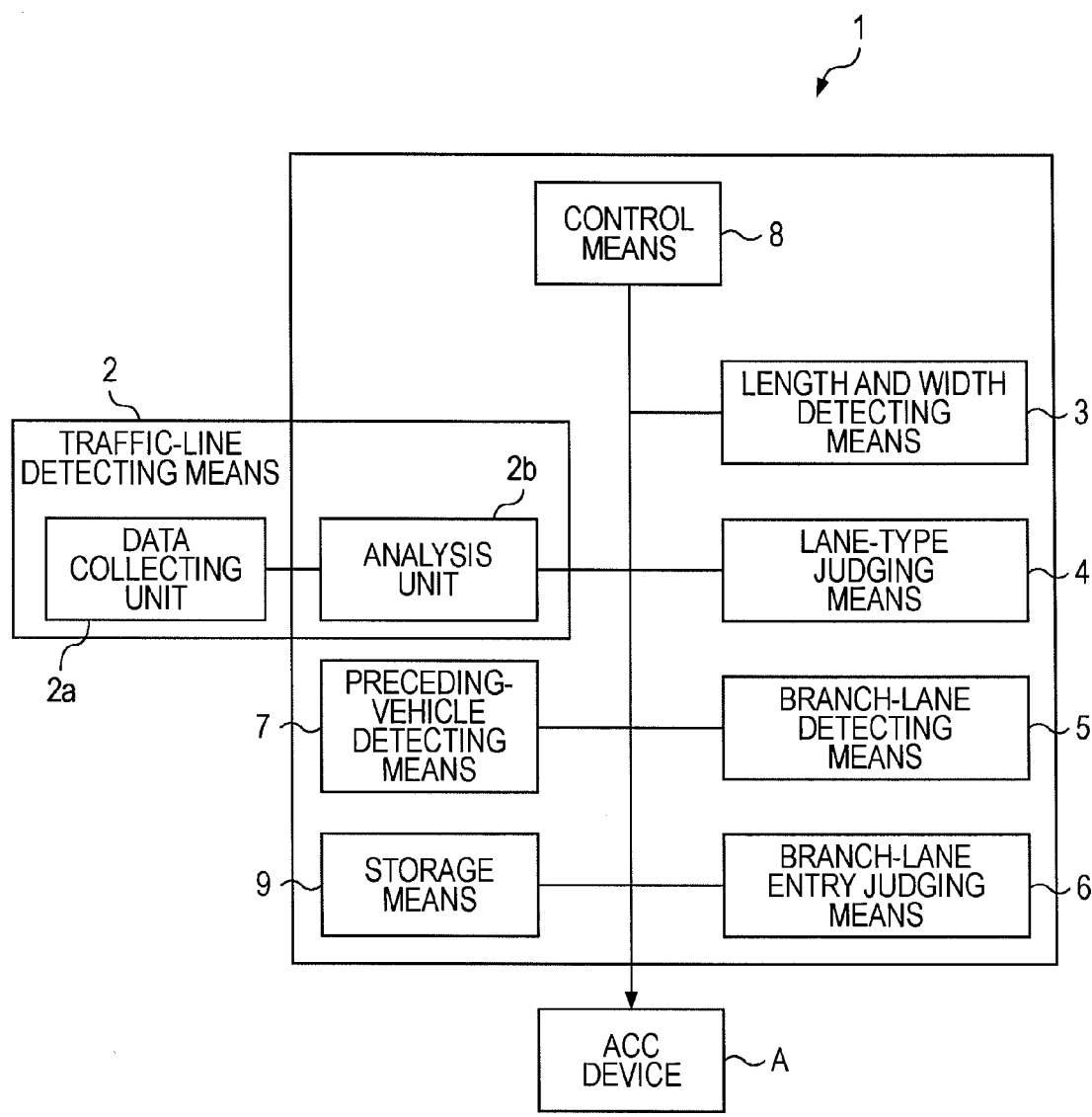
FIG. 1 is a block diagram showing the configuration of a branch-lane entry judging system according to an embodiment of the present invention.

As shown in FIG. 1, a branch-lane entry judging system 1 according to this embodiment includes a traffic-line detecting means 2 having a data collecting unit 2a and an analysis unit 2b, a length and width detecting means 3, a lane-type determining means 4, a branch-lane detecting means 5, a branch-lane entry judging means 6, a preceding-vehicle detecting means 7, a control means 8, and a storage means 9. A signal from the branch-lane entry judging system 1 is output to an ACC device A.

In this embodiment, the ACC device A performs control so that a vehicle in which the branch-lane entry judging system 1 is mounted runs at a constant speed set by a driver. When there is a preceding vehicle, the ACC device A also automatically controls an accelerator throttle, a brake mechanism, and so on of the vehicle so that the vehicle follows the preceding vehicle.

The traffic-line detecting means 2 in the branch-lane entry judging system 1 detects traffic lines on the right and left sides of the vehicle. In this embodiment, the traffic-line detecting means 2 includes an image-taking means for taking an image of the surroundings of the vehicle, and detects traffic lines from the image taken by the image-taking means. More specifically, the traffic-line recognizing apparatus disclosed in Japanese Unexamined Patent Application Publication No. 2006-331389 filed earlier by the present applicant is adopted. A brief description will be given below of the traffic-line detecting means 2.

Figure 2:
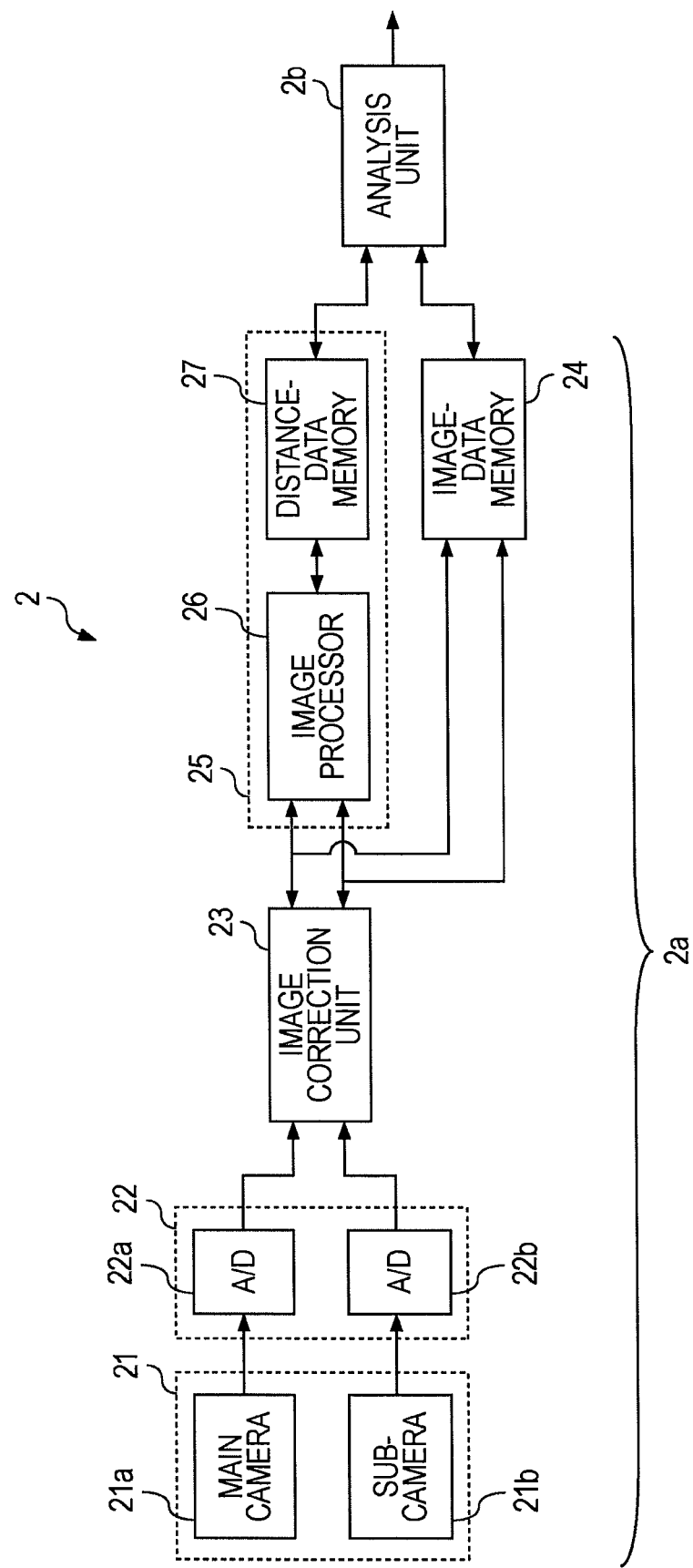
FIG. 2 is a block diagram showing the configuration of a traffic-line detecting means in the embodiment.

The traffic-line detecting means 2 has a configuration shown in FIG. 2. In the data collecting unit 2a, a pair of images of the surroundings of the vehicle are taken by an image-taking means 21 including a main camera 21a and a sub-camera 21b that are arranged with a predetermined interval in the width direction of the vehicle. The taken images are converted into digital images by A/D converters 22a and 22b serving as a conversion means 22, and are subjected to image correction, such as removal of displacement and noise and correction of the brightness, by an image correction unit 23. The corrected digital images are stored in an image-data memory 24 and are also transmitted to the analysis unit 2b.

After image correction, the taken images are transmitted to an image processing means 25. An image taken by the main camera 21a (hereinafter referred to as a reference image T) is divided into a plurality of pixel blocks by an image processor 26. Correspondingly to the pixel blocks, pixel blocks of an image taken by the sub-camera 21b are found by stereo matching, and a parallax is calculated for each pixel block. A method for calculating the parallax has been described in detail in Japanese Unexamined Patent Application Publication No. Hei 5-114099 filed earlier by the present applicant.

The parallax can be correlated with the position in real space according to the principle of triangulation. More specifically, the relationship among the point (X, Y, Z) in real space, the parallax dp, and the coordinates (i, j) of a pixel block on the reference image T can be given by the following expressions:

$$X = CD/2 + Z \times PW \times (i - IV) \quad (1)$$

$$Y = CH + Z \times PW \times (j - JV) \quad (2)$$

$$Z = CD/(PW \times (dp - DP)) \quad (3)$$

where a point on the road surface just below the midpoint between the main camera 21a and the sub-camera 21b in real space is designated as the origin, the X-axis indicates the width direction, that is, the right-left direction of the vehicle, the Y-axis indicates the vehicle height direction, and the Z-axis indicates the vehicle length direction, that is, the distance direction.

Herein, CD represents the distance between the main camera 21a and the sub-camera 21b, PW represents the viewing angle for one pixel, CH represents the mounting height of the main camera 21a and the sub-camera 21b, IV and JV respectively represent i and j coordinates of the point at infinity in front of the vehicle, and DP represents the vanishing point parallax.

The image processing means 25 assigns parallaxes dp to the pixel blocks in the reference image T, stores the parallaxes dp in a distance-data memory 27, and transmits information about the parallaxes dp to the analysis unit 2b. Hereinafter, an image formed by the pixel blocks with the assigned parallaxes dp on the reference image T will be referred to as a distance image.

The analysis unit 2b in the traffic-line detecting means 2 is a computer in which a CPU, a ROM, a RAM, an input/output interface, etc. that are not shown are connected to a bus.

Figure 3:
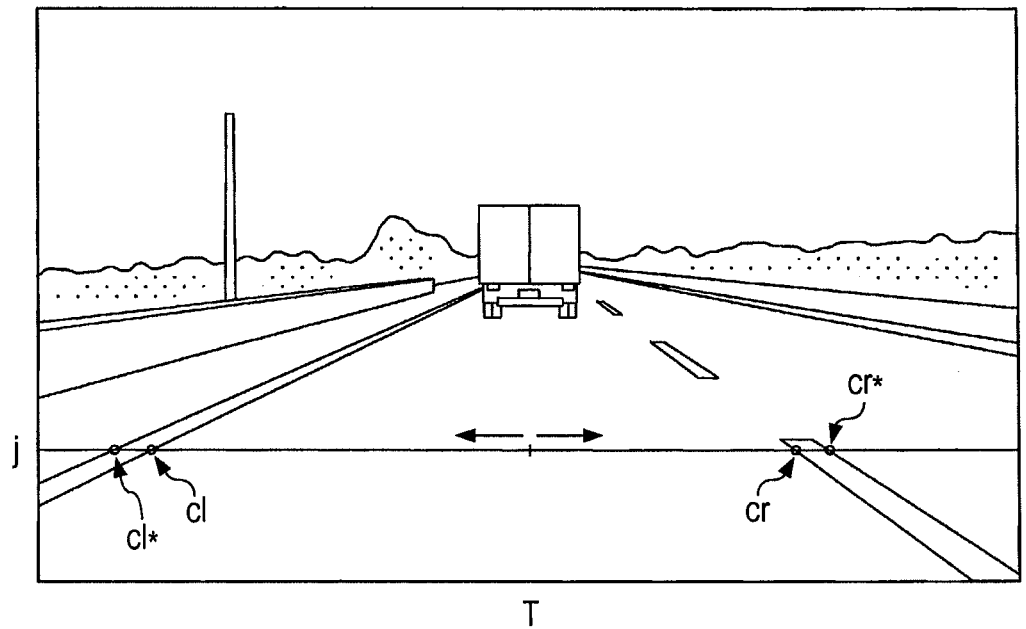
FIG. 3 shows a reference image and traffic-line candidate points.

For example, as shown in FIG. 3, the analysis unit 2b sequentially calculates changes in brightness between the adjacent pixels on a horizontal line j, which has a width corresponding to the width of one pixel on the reference image T, from the center of the reference image T in the right and left directions, and detects, as traffic-line candidate points cl and cr, pixels which change in brightness by an amount more than or equal to a set threshold value. While sequentially shifting the horizontal line j upward by one pixel on the reference image T, traffic-line candidate points are detected on each horizontal line j. In this case, the analysis unit 2b removes traffic-line candidate points, which are judged, on the basis of the distance image, not to exist on a road surface, from the detected traffic-line candidate points.

On the basis of the traffic-line candidate points close to the vehicle, of the remaining traffic-line candidate points, traffic lines are approximated by straight lines. The traffic lines are detected on the right and left sides of the vehicle. In this case, detection reliability is improved, for example, by removing traffic-line candidate points that are not consistent with the straight lines. When a plurality of traffic lines are detected on one side (for example, the right side) of the vehicle, a traffic line that is consistent with a traffic line detected on the other side (for example, the left side) of the vehicle, or a traffic line that is consistent with a traffic line detected in the previous sampling period is selected. Consequently, straight lines are selected on either side of the vehicle.

Figure 4:
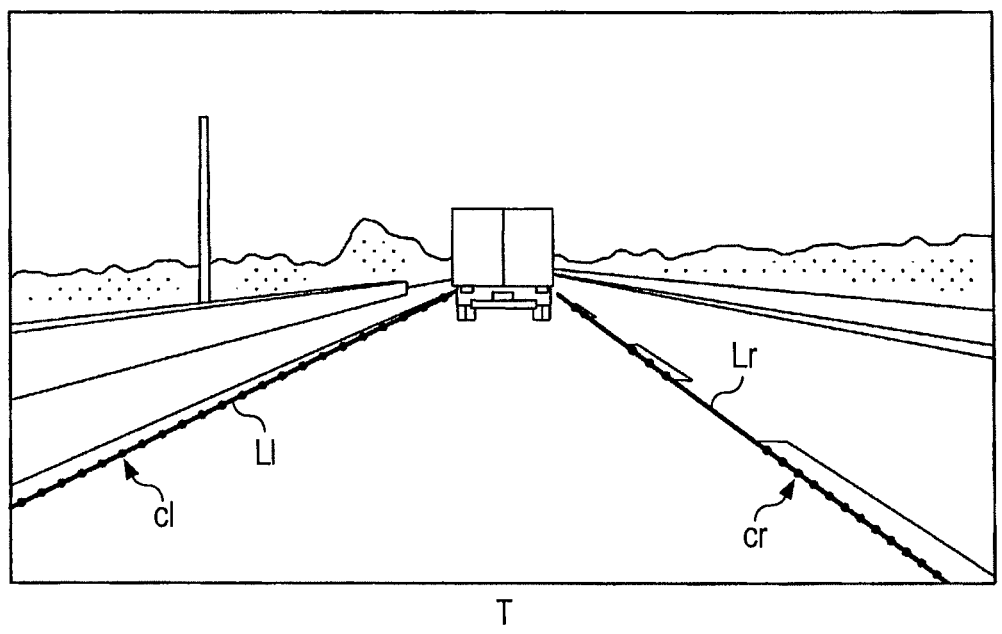
FIG. 4 shows right and left traffic lines detected in the reference image.

After the straight lines are thus detected near the vehicle, traffic-line candidate points farther from the vehicle than the detected straight lines are selected and linked, for example, on the basis of the positional relationship with the straight lines, so that traffic lines Ll and Lr are respectively detected on the left and right sides of the vehicle, as shown in FIG. 4. Hereinafter, the traffic lines Ll and Lr on the left and right sides of the vehicle will be referred to as a left traffic line Ll and a right traffic line Lr. While the traffic-line candidate points cl and cr are sparsely detected in the reference image T shown in FIG. 4, in actuality, a lot of traffic-line candidate points are detected densely.

As described above, the traffic-line detecting means 2 is described in detail as the traffic-line recognizing apparatus in Japanese Unexamined Patent Application Publication No. 2006-331389. This publication is referred to for a detail description of the traffic-line recognizing apparatus.

In this embodiment, the length and width detecting means 3, the lane-type determining means 4, the branch-lane detecting means 5, the branch-lane entry judging means 6, the preceding-vehicle detecting means 7, the control means 8, and the storage means 9 shown in FIG. 1 are included in the same computer as the computer that forms the analysis unit 2b of the traffic-line detecting means 2.

The length and width detecting means 3 detects the lengths of the left traffic line Ll and the right traffic line Lr, which are detected by the traffic-line detecting means 3, in the traveling direction of the vehicle in real space and the widths thereof in real space.

More specifically, when the traffic-line detecting means 2 detects the traffic-line candidate points cl and cr on the horizontal line j in the reference image T, as shown in FIG. 3, the length and width detecting means 3 detects, as end points cl* and cr*, pixels which correspond to the traffic-line candidate points cl and cr and whose brightnesses greatly decrease from the brightness of the adjacent pixels by an amount more than or equal to a set threshold value.

By substituting the coordinates (i, j) of the traffic-line candidate points cl and cr and the end points cl* and cr* in the reference image T and the parallaxes dp into Expressions (1) to (3) described above, the distance between the traffic-line candidate point cl and the end point cl* in real space in the X-axis direction, that is, in the right-left direction and the distance between the traffic-line candidate point cl and the end point cl* in real space in the X-axis direction are calculated. The distances are detected as widths of the left traffic line Ll and the right traffic line Lr extending beside the vehicle in real space. This operation is performed every time the traffic-line detecting means 2 detects traffic-line candidate points cl and cr while shifting the horizontal line j upward in the reference image T.

By similar calculation, the length and width detecting means 3 also detects the distances in the Z-axis direction, that is, in the traveling direction of the vehicle, of the traffic-line candidate points cl and cr detected by while shifting the horizontal line j upward. Traffic-line candidate points that are adjacently arranged in the Z-axis direction with an interval less than or equal to a preset threshold value are combined into the same group. Further, when the distance in the Z-axis direction between a traffic-line candidate point detected on a certain horizontal line j and a traffic-line candidate point closest thereto, which has already been detected, is more than the threshold value, the traffic-line candidate points are assigned to different groups. One group corresponds to a painted portion of a traffic line on the road surface.

Then, the length and width detecting means 3 calculates the distance in the Z-axis direction of the group thus detected, that is, the painted portion of the traffic line in real space, and detects the distance as the length of the traffic line Ll or Lr in the traveling direction of the vehicle in real space. When a plurality of groups are detected, the distance between the groups in the traveling direction, that is, the length of an unpainted portion between the two painted portions of the traffic line is also detected.

When the width of the traffic line thus detected is less than, for example, 0.2 m, the length and width detecting means 3 judges the traffic line as a normal traffic line. Further, when the length in the traveling direction of the painted portion in the same group exceeds a predetermined length, it is judged that the traffic line is a solid line. When the length of the painted portion and the distance between the unpainted portions are equal to predetermined lengths, it is judged that the traffic line is a broken line.

The configurations of the traffic-line detecting means 2 and the length and width detecting means 3 are not limited to the above. The traffic-line detecting means 2 and the length and width detecting means 3 may have any configurations that can detect the traffic lines Ll and Lr on the right and left sides of the vehicle and that can detect the widths and lengths in the traveling direction of the traffic lines Ll and Lr.

The lane-type determining means 4 (see FIG. 1) determines the line type of the traffic line on the basis of the result of detection performed by the length and width detecting means 3, judges on which side of the vehicle a solid traffic line exists, and thereby determines the type of the lane in which the vehicle is running.

For example, when a left traffic line Ll is a solid line and a right traffic line Lr is a broken line, as shown in FIG. 3, the lane-type determining means 4 determines that the vehicle is running in the leftmost lane on the road. Conversely, when a right traffic line Lr is a solid line and a left traffic line Ll is a broken line, the lane-type determining means 4 determines that the vehicle is running in the rightmost lane on the road.

When both left and right traffic lines Ll and Lr are solid lines, the lane-type determining means 4 determines that the vehicle is running in a lane that prohibits the vehicle from protruding therefrom for passing (hereinafter referred to as a protrusion-prohibiting lane).

On the basis of the result of detection performed by the length and width detecting means 3, when a traffic line detected as a solid line changes to a block line, the branch-lane detecting means 5 (see FIG. 1) detects that a branch lane exists near the changed traffic line. More specifically, when a traffic line detected as a solid line changes to a broken line and the length and width detecting means 3 detects that the width of the changed traffic line is within a range of 0.3 to 0.75 m and that the length of a painted portion of the line is within a range of 2 to 5 m, the branch-lane detecting means 5 determines that the detected traffic line has changed to a block line wider and shorter than the normal traffic line.

In order to detect that the traffic line changes from a solid line to a block line, the branch-lane detecting means 5 has a means for holding a history showing that a traffic line currently detected as a block line was a solid line in the previous sampling period. In this embodiment, a counter (left-lane running counter Lcount) is used as the means for holding the history, as will be described below. The count value of the counter, which serves as a history, is increased or set at a fixed value while a traffic line on one side of the vehicle is a solid line. When the traffic line on the one side is detected as a block line, the count value is referred to. When the count value indicates that the traffic line was a solid line before, it is determined that the traffic line has changed from the solid line to the block line.

Figure 5:
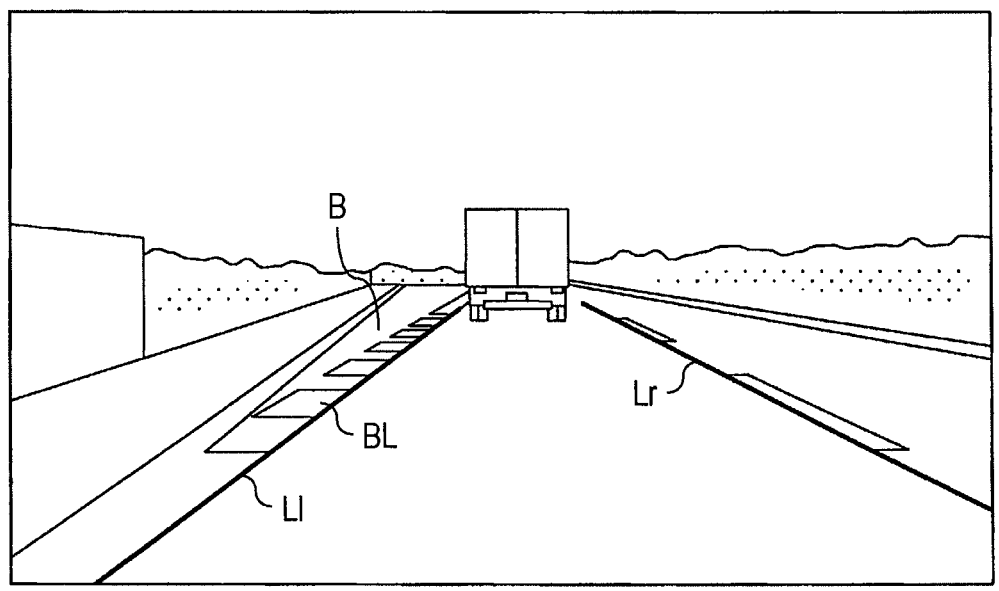
FIG. 5 shows images of a block line and a branch lane taken in the reference image.

For example, when it is determined, on the basis of the length in the traveling direction and width of the traffic line in real space, that a left traffic line Ll detected as a solid line, as shown in FIG. 3 has changed to a block line BL shown in FIG. 5, the branch-lane detecting means 5 detects that a branch lane B exists beside the changed traffic line, that is, on the left side of the block line BL extending on the left side of the vehicle in FIG. 5.

Figure 6:
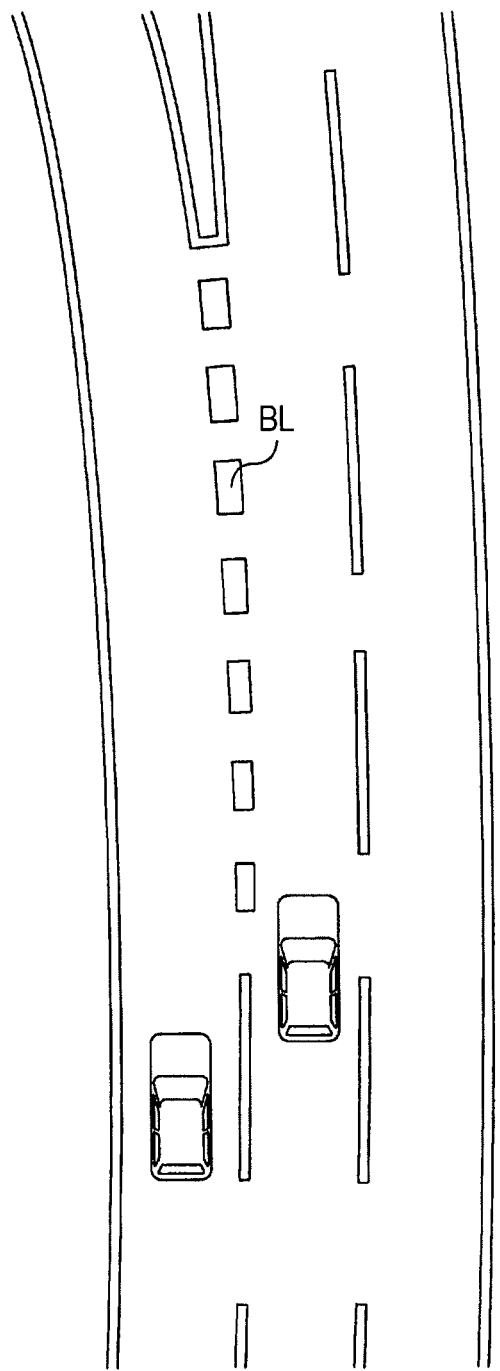
FIG. 6 shows a case in which a branch lane is not detected when a traffic line changes from a broken line to a block line.

For example, when one of the three lanes separates from the other two lanes, as shown in FIG. 6, a broken traffic line sometimes changes to a block line BL. In this case, even when a broken traffic line on the left or right side of the vehicle changes to a block line BL, the branch-lane detecting means 5 does not detect a lane on the left or right side of the block line BL as a branch lane.

Therefore, when the vehicle is running in the leftmost lane and the left traffic line Ll changes from a solid line to a block line BL, when the vehicle is running in the rightmost lane and the right traffic line Lr changes from a solid line to a block line, and when the vehicle is running in a protrusion-prohibiting lane and one of the left and right traffic lines Ll and Lr changes from a solid line to a block line, the branch-lane detecting means 5 determines that a branch lane exists outside the changed traffic line.

When the vehicle moves toward a branch lane B or a directional indicator is operated toward the branch lane B while the branch-lane detecting means 5 is detecting the branch lane B, the branch-lane entry judging means 6 (see FIG. 1) determines that the vehicle will enter the branch lane B.

In this embodiment, the branch-lane entry judging means 6 detects that a turn-signal switch (not shown) is turned toward the branch lane B or receives information about turning, and determines that the directional indicator is operated toward the branch lane B. Therefore, even when the directional indicator is operated, if the turn-signal switch is turned in a direction opposite the branch lane B, the branch-lane entry judging means 6 does not determine that the vehicle will enter the branch lane B.

Further, movement of the vehicle into the branch lane B is detected when the position of the wheel of the vehicle near the branch lane B touches an inner edge of the block line converted in real space. At that time, it is determined that the vehicle is moving toward the branch lane B and will enter the branch lane B. The condition for judging movement of the vehicle into the branch lane B may be appropriately determined. For example, judgment can be made when the wheel of the vehicle near the branch lane B deviates from the center of the block line toward the branch lane B, when the steering wheel is turned toward the branch lane B by a predetermined steering angle or more, or when a traveling locus Lest of the vehicle, which will be described below, points toward the branch lane B.

As shown in FIG. 1, the branch-lane entry judging system 1 also includes the preceding-vehicle detecting means 7. The preceding-vehicle detecting means 7 reads the distance image from the distance-data memory 27 of the data collecting unit 2a in the traffic-line detecting means 2, and detects a preceding vehicle from the reference image T according to information about the parallaxes dp of the pixel blocks in the distance image.

Figure 7:
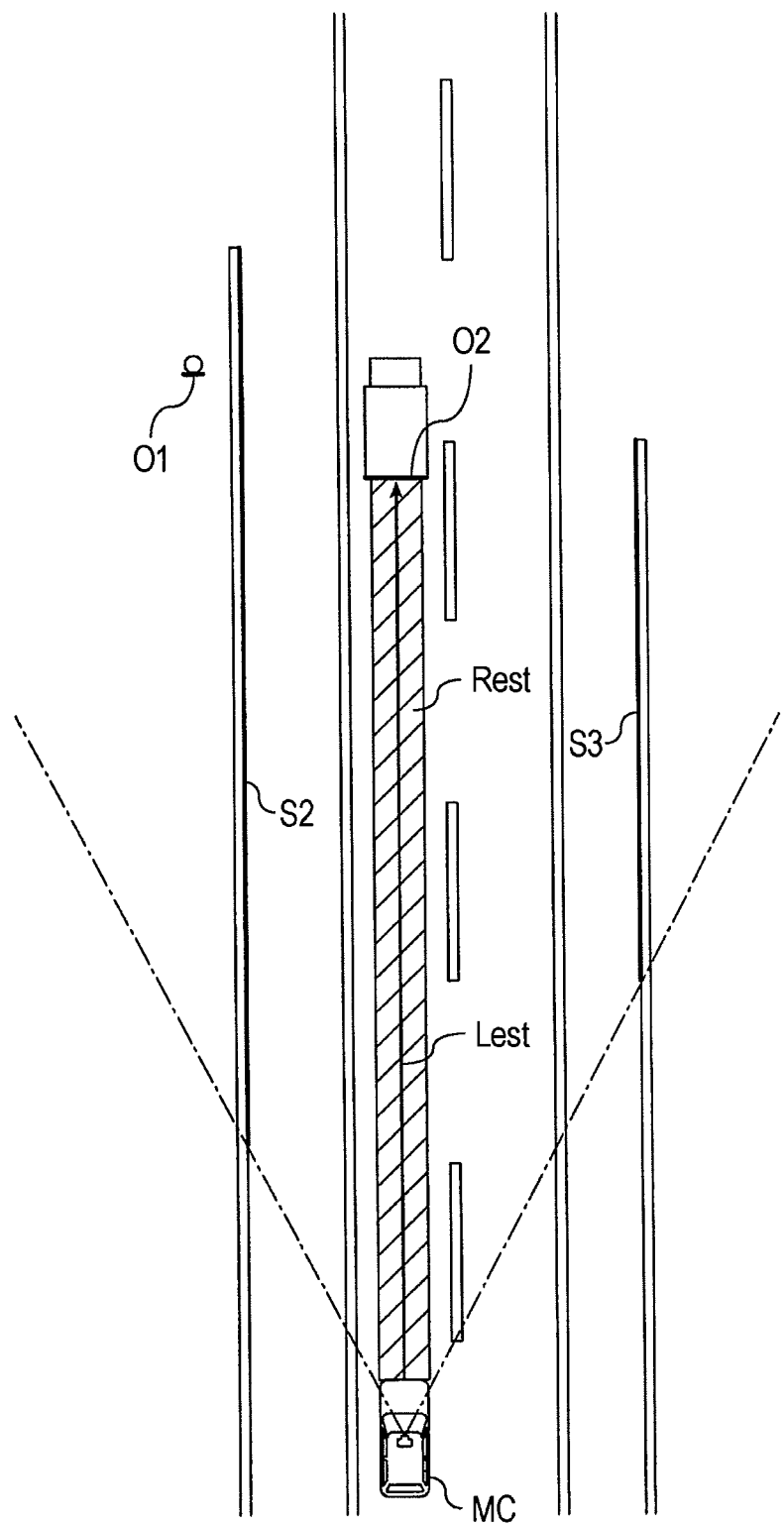
FIG. 7 explains three-dimensional objects, a preceding vehicle, a traveling locus, and a traveling path of a vehicle detected in a real space.
Figure 8:
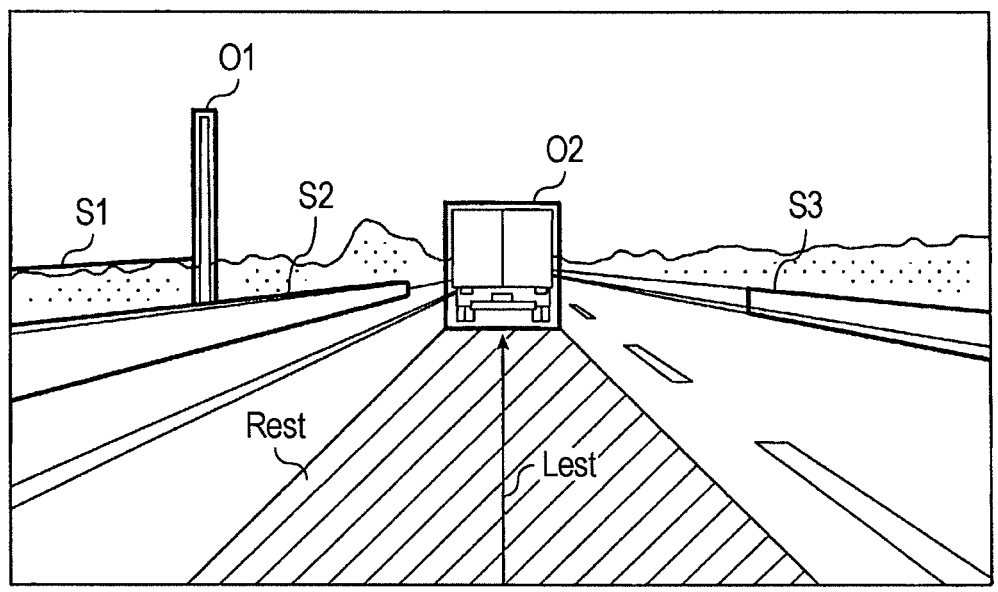
FIG. 8 explains the three-dimensional objects, the preceding vehicle, the traveling locus, and the traveling path of the vehicle detected in the reference image.

In this embodiment, the preceding-vehicle detecting means 7 is based on the vehicle surroundings monitoring apparatuses disclosed in Japanese Unexamined Patent Application Publication Nos. 10-283461 and 10-283477 filed earlier by the present applicant. For example, on the basis of the reference image T shown in FIG. 3, three-dimensional objects existing within an image-taking region in front of a vehicle MC, in which the branch-lane entry judging system 1 is mounted, and above the road surface are detected, as shown in FIG. 7. In the reference image T, three-dimensional objects existing above the road surface can be detected in a manner such as to be enclosed by frames, as shown in FIG. 8. Labels O and S put on the detected three-dimensional objects represent the types of detected faces of the three-dimensional objects, that is, indicate that side faces and rear faces of the three-dimensional objects are detected.

The preceding-vehicle detecting means 7 estimates a traveling locus Lest of the vehicle MC, as shown in FIGS. 7 and 8. More specifically, the preceding-vehicle detecting means 7 calculates a turning curvature Cua of the vehicle MC according to the following expression (4) or expressions (5) and (6) on the basis of the vehicle speed V of the vehicle MC, the yaw rate γ, the steering angle δ of the steering wheel, etc input from a vehicle speed sensor, a yaw-rate sensor, and a steering-angle sensor (not shown):

$$Cua = \gamma/V \quad (4)$$

$$Re = (1 + Asf \cdot V^2) \cdot (Lwb/\delta) \quad (5)$$

$$Cua = 1/Re \quad (6)$$

where Re represents the turning radius, Asf represents the stability factor of the vehicle, and Lwb represents the wheel base.

Then, the preceding-vehicle detecting means 7 calculates and estimates a traveling locus Lest of the vehicle MC on the basis of the calculated turning curvature Cua. In this embodiment, the preceding-vehicle detecting means 7 detects, as a preceding vehicle, a three-dimensional object closest to the vehicle MC, of three-dimensional objects existing on a traveling path Rest of the vehicle MC serving as a region having a width equal to the width of the vehicle MC and centered on the traveling locus Lest. In the example shown in FIGS. 7 and 8, a truck serving as a three-dimensional object O2 is detected as a preceding vehicle.

The configuration of the preceding-vehicle detecting means 7 is not limited to above as long as the preceding-vehicle detecting means 7 can detect a preceding vehicle.

The results of detection and judgment performed by the length and width detecting means 3, the lane-type determining means 4, the branch-lane detecting means 5, the branch-lane entry judging means 6, and the preceding-vehicle detecting means 7 are appropriately stored in the storage means 9, and are read from the storage means 9, as necessary.

A control configuration of the control means 8 (see FIG. 1) will now be described with reference to FIGS. 9 to 11 serving as flowcharts. In addition, the operation of the branch-lane entry judging system 1 according to this embodiment will be described.

In the following description, it is assumed that the vehicle is running on an expressway and that the ACC device A is in operation. When the preceding-vehicle detecting means 7 detects a preceding vehicle, the control means 8 outputs information about the distance between the vehicle MC and the preceding vehicle and the speed of the preceding vehicle to the ACC device A. When the ACC device A does not receive information about the preceding vehicle, it performs constant-speed running control on the vehicle MC. When the ACC device A receives information about the preceding vehicle, it performs ACC control by appropriately selecting preceding-vehicle follow control on the vehicle MC in accordance with the above-described distance and speed and constant-speed running control on the vehicle MC.

In an initial state of the branch-lane entry judging system 1, a branch-lane flag F, a left-lane traveling counter Lcount, and a slower-lane counter Scount, which will be described below, are set at 0.

When the traffic-line detecting means 2 detects traffic lines Ll and Lr on the left and right sides of the vehicle (Step S1), the control means 8 causes the length and width detecting means 3 to detect the lengths in the running direction of the detected left and right traffic lines Ll and Lr in real space and the widths of the traffic lines in real space in the above-described manner (Step S2). When the detected traffic line is a broken line, the interval between unpainted portions of the traffic line is also detected.

Subsequently, the lane-type determining means 4 judges, on the result of detection performed by the length and width detecting means 3, on which side of the vehicle a solid traffic line exists, and determines the type of the lane in which the vehicle is running.

Figure 9:
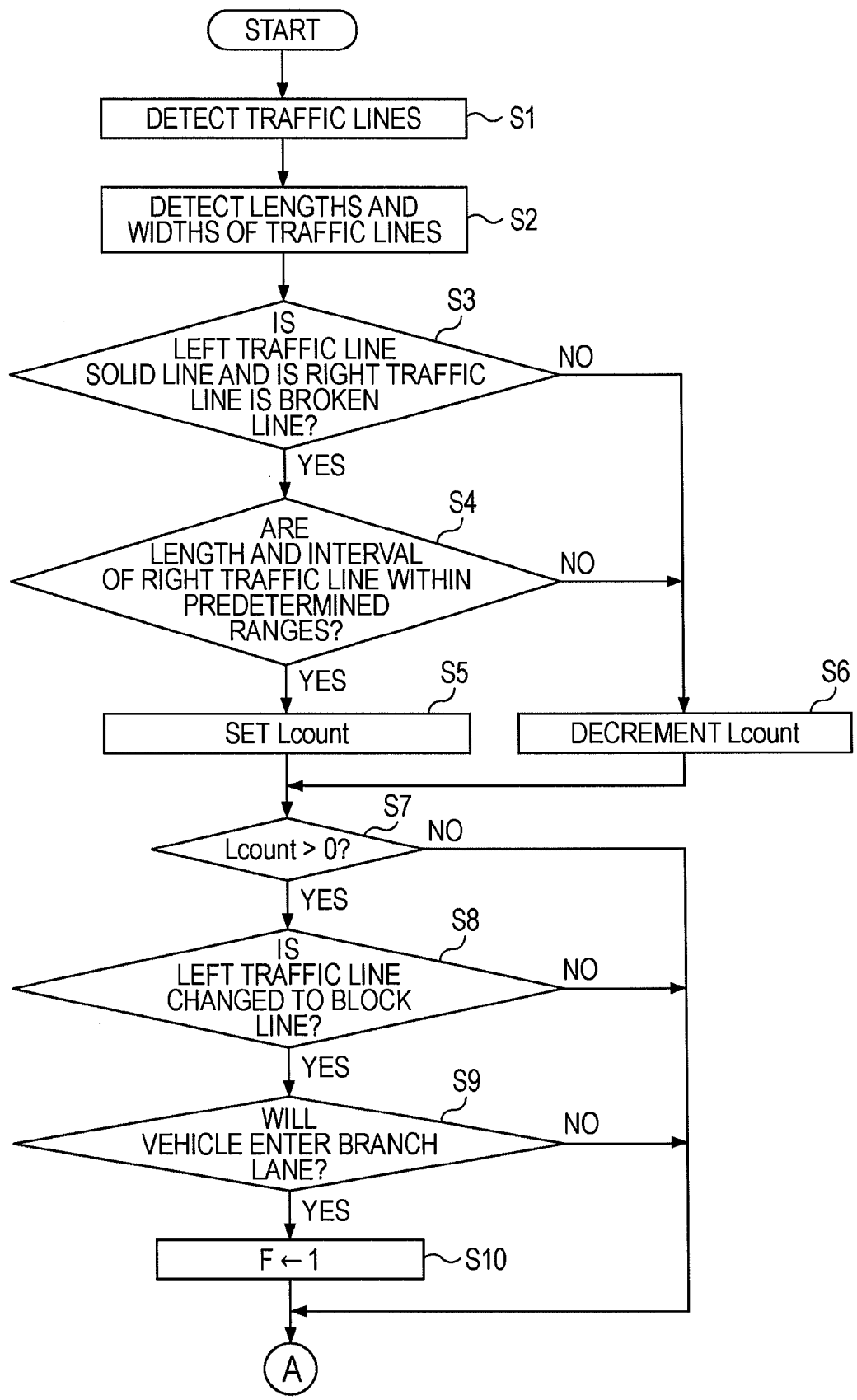
FIG. 9 is a flowchart showing a control procedure performed by a control means in the branch-lane entry judging system according to the embodiment.
Figure 10:
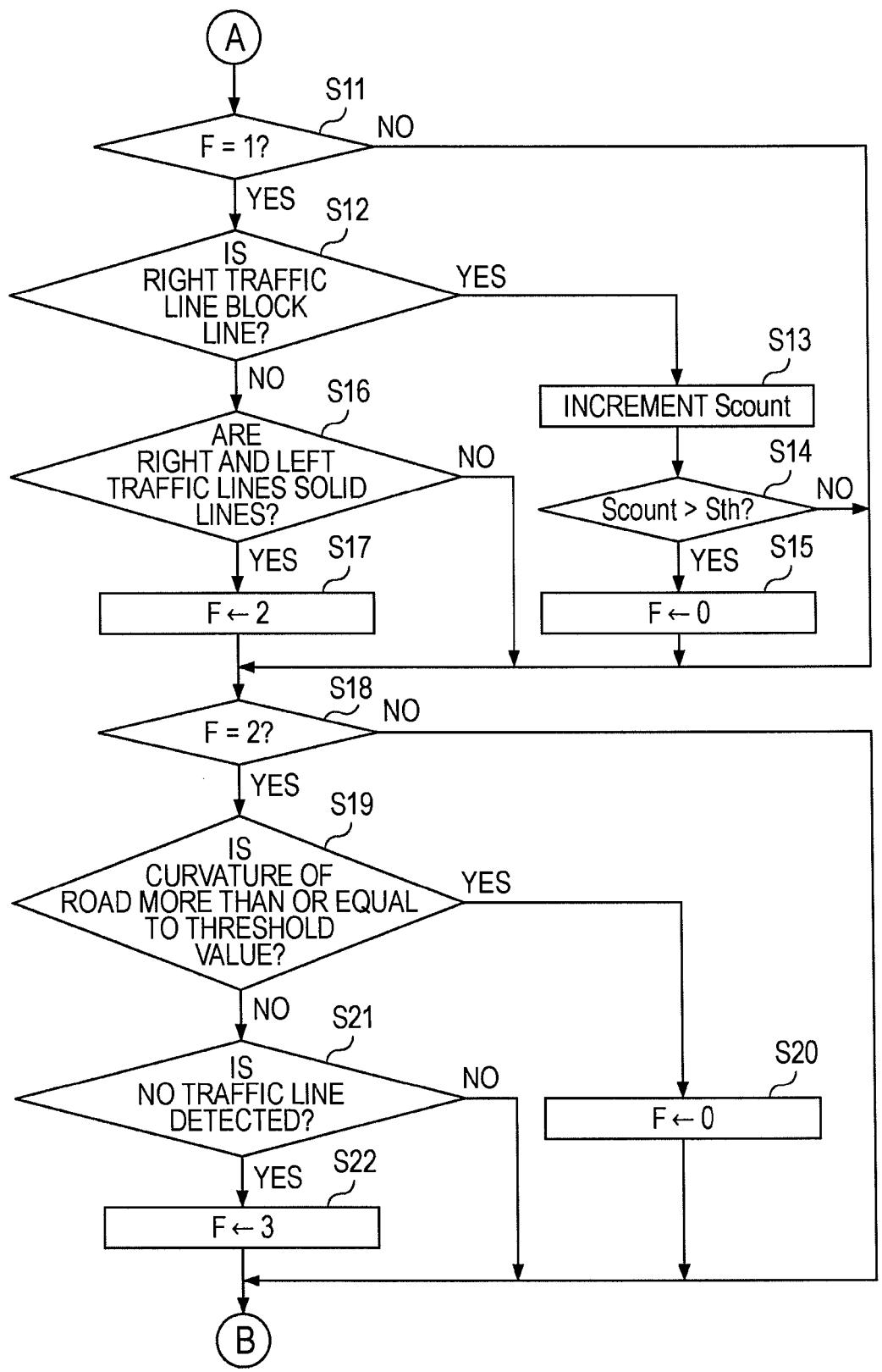
FIG. 10 a flowchart showing the control procedure performed by the control means in the branch-lane entry judging system.

For example, when the left traffic line Ll is a solid line, the right traffic line Lr is a broken line, and the lane-type determining means 4 judges that the vehicle is running in the leftmost lane on the road, as shown in FIG. 7 (Step S3 in FIG. 9: YES), the control means 8 judges, on the basis of the result of detection performed by the length and width detecting means 3, whether the length of painted portions and the interval between unpainted portions of the broken right traffic line Lr are within predetermined ranges (Step S4).

The length of painted portions and the interval between unpainted portions in the broken right traffic line Lr during running in the left lane are detected in order to check whether the vehicle is running on the expressway. In this embodiment, the predetermined range of the length of the painted portions of the traffic line is 8±1 m, and the predetermined range of the interval between the unpainted portions is 12±2 m. When the branch-lane entry judging system 1 according to this embodiment is operated during running in an ordinary road different from the expressway, the ranges serving as the reference for judgment may be changed, or this checking operation can be omitted.

When the control means 8 determines that the length of painted portions and the interval between unpainted portions in the right traffic line Lr are within the predetermined ranges (Step S4: YES), it sets a predetermined count value in the left-lane running counter Lcount (Step S5). In this embodiment, the left-lane running counter Lcount serves as the above-described means for holding the history. The significance of the left-lane running counter Lcount will be described below.

When the lane-type determining means 4 determines that the vehicle is running in a lane different from the leftmost lane on the road (Step S3: NO) or that one or both of the length of painted portions and the interval between unpainted portions in the broken right traffic line Lr are not within the predetermined ranges (Step S4: NO), the control means 8 decrements the count value of the left-lane running counter Lcount by one in each sampling period.

Subsequently, the control means 8 judges whether the count value of the left-lane running counter Lcount is more than 0 (Step S7). When the count value is more than 0 (Step S7: YES), the control means 8 causes the branch-lane detecting means 5 to judge, in the above-described manner, whether the left traffic line Ll has changed to a block line (Step S8).

For example, when the vehicle MC is running in the leftmost lane and is not reaching the entrance of an interchange or a parking area, as shown in FIG. 7, it is judged that the left traffic line Ll is a solid line, but does not change to a block line (Step S8 in FIG. 9: NO). Further, when the branch-lane flag F remains the initial value 0, subsequent steps in the flowchart are not performed, the above-described routine is repeated, and the left-lane running counter Lcount is set at a predetermined count value in every sampling period. When it is judged that the vehicle is running in a lane different from the leftmost lane, the count value of the left-lane running counter Lcount is decremented by one.

Figure 12:
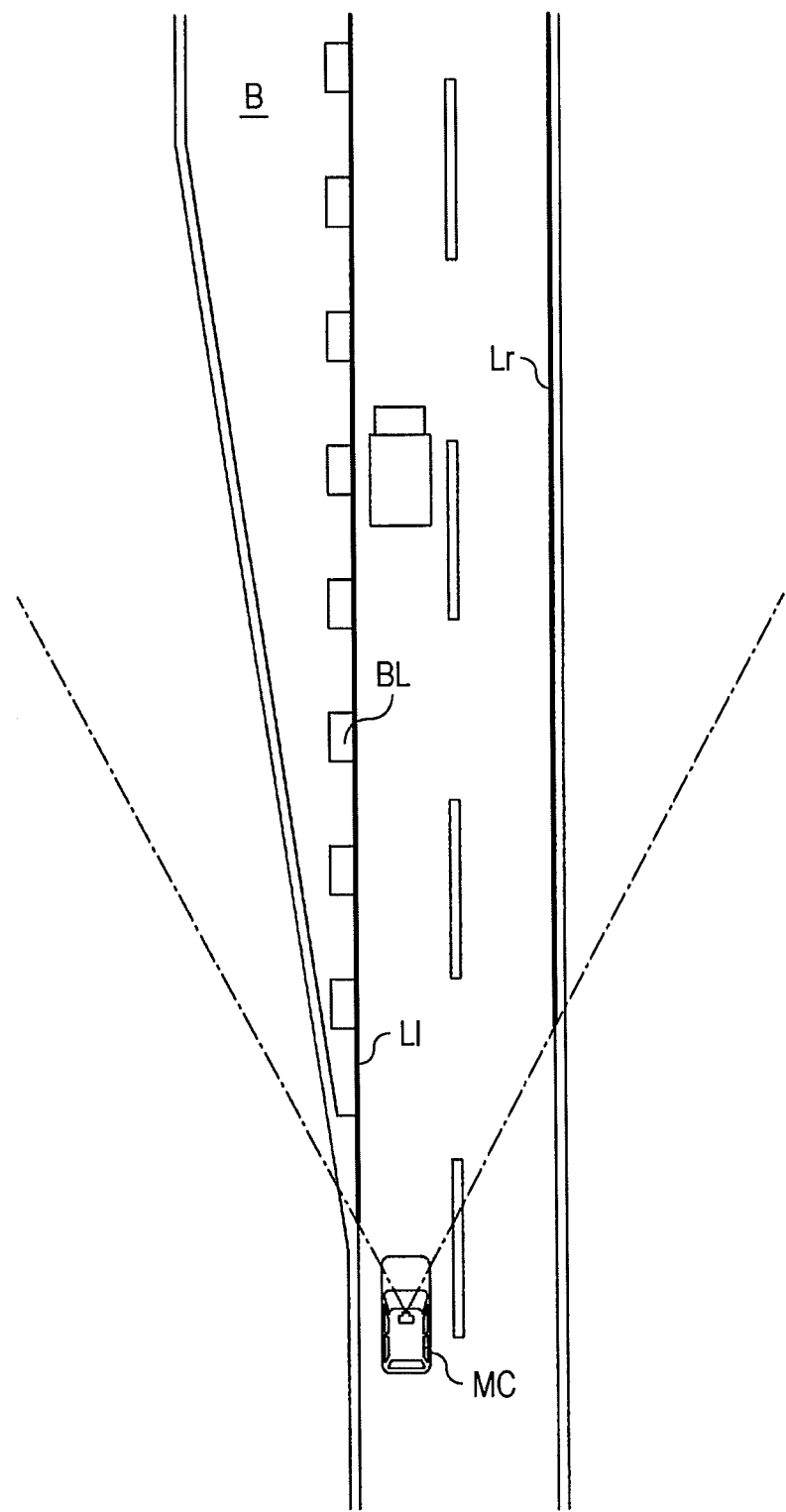
FIG. 12 shows a block line and a branch lane detected in real space.

In contrast, when the vehicle MC is reaching the entrance of an interchange or a parking area while running in the leftmost lane on the expressway and the branch-lane detecting means 5 judges in a certain sampling period that left traffic line Ll labeled as a solid line has changed to a block line BL having a width of 0.3 to 0.75 m and including painted portions having a length of 2 to 5 m, as shown in FIG. 12 (Step S8 in FIG. 9: YES), the branch-lane detecting means 5 detects a branch lane B on the left side of the block line BL, and the control means 8 changes the label of the left traffic lane Ll from the solid line to a block line.

A description will now be given of the significance of the left-lane running counter Lcount serving as the means for holding the history. The branch lane B on the expressway is detected by detecting that the left traffic line Ll on the left side of the vehicle MC running in the leftmost lane has changed to a block line. However, when the label of the left traffic line Ll is merely changed from a solid line to a block line, as described, it is judged in Step S3 in the next and subsequent sampling periods that the vehicle MC is not running in the leftmost lane. Therefore, a history showing that the solid left traffic line Ll has changed to a block line is not held.

Accordingly, in order to hold a history showing that the left traffic line Ll currently detected as a block line was a solid line at least until several seconds ago and has changed to the block line, while it is judged that the vehicle MC is running in the leftmost lane (Step S3: YES), the count value of the left-lane running counter Lcount indicating the history is set at a predetermined value (Step S5). Even after the left traffic line Ll changes to a block line BL (Step S3: NO), while a count value more than 0 is held (Step S7: YES), a history showing that the left traffic line Ll detected as the block line BL was detected as a solid line before is preserved.

By thus detecting that the solid left traffic line Ll has changed to the block line BL (Step S8: YES), the branch lane B is detected while assuring that the left traffic line Ll on the left side of the vehicle MC running in the leftmost lane has changed to the block line BL.

As the means for holding the history, the count value of the left-lane running counter Lcount can be incremented one by one and incrementing can be finished at the time when the count value reaches a predetermined upper limit, instead of setting the count value of the left-lane running counter Lcount at a predetermined count value every time it is detected in Step S5 that the vehicle MC is running in the leftmost lane, as in this embodiment. Alternatively, a flag may be set as the means for holding the history at a time when it is detected that the vehicle MC is running in the leftmost lane on the expressway, and the flag may be reset at a time when it is detected that the vehicle MC is not running in the leftmost lane for a predetermined period or while the vehicle MC runs by a predetermined distance.

When the control means 8 judges that the left traffic line Ll has changed to a block line (Step S8: YES), it then causes the branch-lane entry judging means 6 to judge, in the above-described manner, whether the vehicle MC will enter the branch lane B (Step S9). When it is judged that the vehicle MC will enter the branch lane B (Step S9: YES), the control means 8 sets the branch-lane flag F at 1 (Step S10). The branch-lane flag F set at 1 means that there is a possibility that the vehicle MC entered the branch lane B.

Subsequently, the control means 8 judges that the branch-lane flag F is 1 (Step S11 in FIG. 10: YES), that is, that the vehicle MC entered the branch lane B. Since the vehicle MC enters the branch lane B across the block line BL on the left side, the control means 8 judges, from the results of detection performed by the traffic-line detecting means 2 and the length and width detecting means 3, whether the block line BL has been detected as a right traffic line Lr (Step S12).

When the control means 8 judges that the right traffic line Lr has changed to the block line BL (Step S12: YES), the count value of the slower-lane counter Scount is incremented by one in every sampling period (Step S13). When the count value of the slower-lane counter Scount exceeds a preset threshold value Sth (Step S14: YES), the branch-lane flag F is reset to 0 (Step S15).

Figure 13:
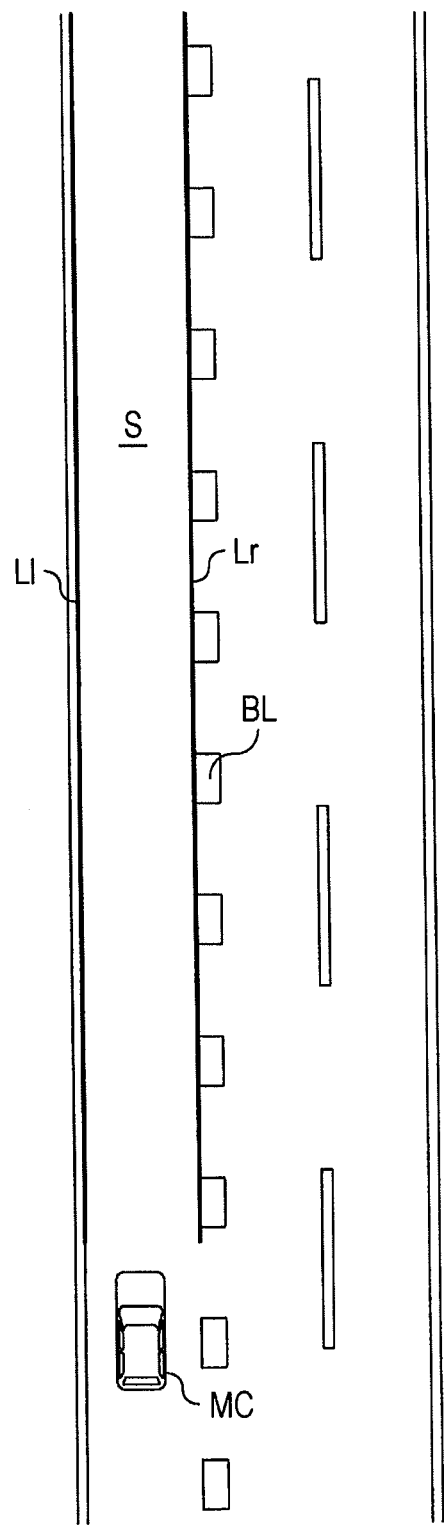
FIG. 13 explains a state in which the vehicle is running in a slower lane.

The above-described operation is performed in order to continuously operate the ACC device A when the vehicle MC is running in a slower lane. In other words, even when the vehicle MC crosses the block line BL, the lane on the left side of the block line BL is sometimes not a branch lane, but is a slower lane, as shown in FIG. 13. In this case, the ACC device A should be operated. Since the branch-lane flag F indicating that the vehicle MC is in the branch lane B is erroneously set at 1, it is reset. Consequently, the ACC device A returns to its normal operation, as will be described below.

When the vehicle MC enters a branch lane B, the right traffic line Lr changes from a block line BL to a solid line. In contrast, when the vehicle MC enters a slower lane S, a state in which the right traffic line Lr is a block line BL, as shown in FIG. 13, continues relatively long. In order to judge whether the vehicle MC is running in a branch lane B and a slower lane S, the count value of the slower-lane counter Scount is incremented to count the time for which the right traffic line Lr stays a block line. For this reason, when the count value of the slower-lane counter Scount does not exceed the preset threshold value Sth (Step S14 in FIG. 10: NO), it is not judged whether the vehicle MC is running in the branch lane B or the slower lane S, and the branch-lane flag F is maintained at 1.

When the control means 8 determines that the branch-lane flag F is set at 1 (Step S11: YES), that is, that there is a possibility that the vehicle MC entered the branch lane B and the right traffic line Lr is not a block line BL (Step S12: NO), it judges, on the basis of results of detection performed by the traffic-line detecting means 2 and the length and width detecting means 3, whether both of the left and right traffic lines Ll and Lr are solid lines (Step S16).

Figure 14:
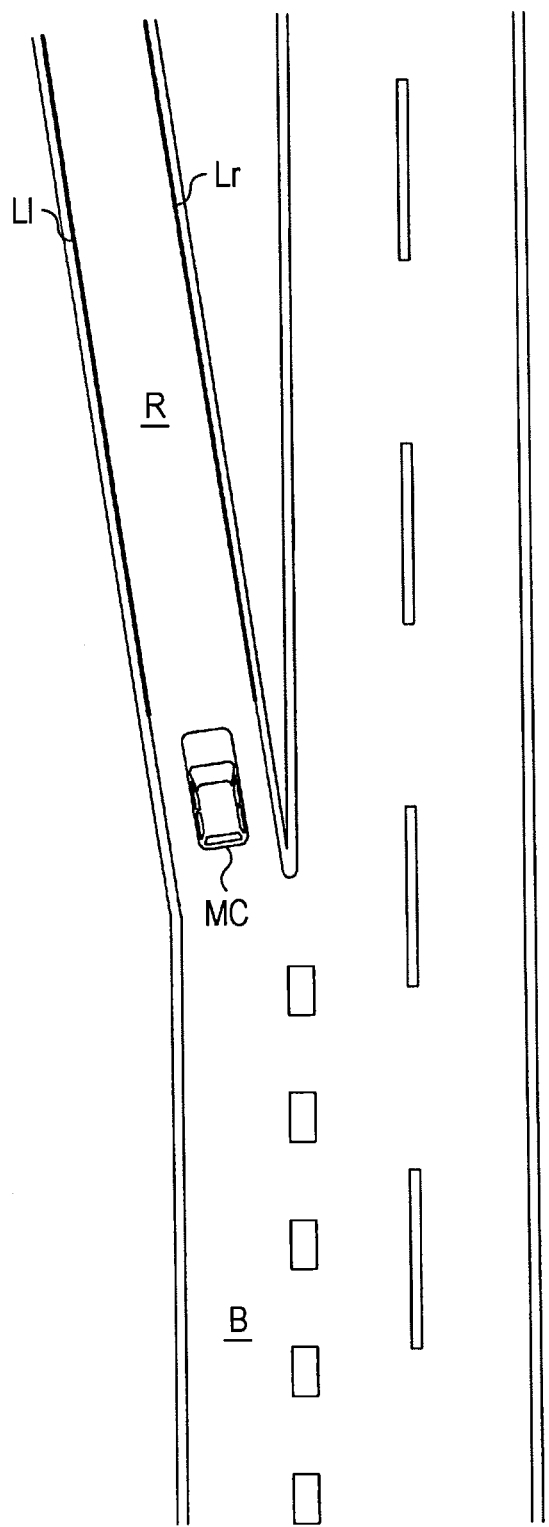
FIG. 14 explains a state in which the vehicle has entered a ramp.

When the vehicle MC runs from the branch lane B into a ramp R (a road for driving off the expressway), as shown in FIG. 14, solid lines Ll and Lr exist on the left and right sides of the vehicle MC, respectively. For this reason, when the control means 8 judges that the right traffic line Lr is not a block line BL and both the left and right traffic lines Ll and Lr are solid lines while the branch-lane flag F is 1 (Step S16 in FIG. 10: YES), it determines that there is a possibility that the vehicle MC entered the ramp R, and sets the branch-lane flag F at 2 (Step S17).

When the branch-lane flag F is 2 (Step S18: YES), the control means 8 judges whether the curvature of the road is more than or equal to a preset threshold value (Step S19). In this embodiment, the vehicle MC has a curve restraint mechanism that optimally performs deceleration by automatically controlling the accelerator throttle, the brake mechanism, etc. of the vehicle MC when the curvature of the road is large. Therefore, the above-described judgment of the curvature is made so that the control according to the present invention is not performed, but automatic control by the curve restraint mechanism is performed when the curvature of the ramp or the like is large.

Accordingly, when the control means 8 determines that the curvature of the road is more than or equal to the preset threshold value (Step S19: YES), it resets the branch-lane flag F (Step S20). The curvature of the road can be calculated on the basis of the left and right traffic lines Ll and Lr detected by the traffic-line detecting means 2, or can be determined on the basis of the turning curvature Cua of the vehicle calculated by the preceding-vehicle detecting means 7 according to the above-described expression (4) or expressions (5) and (6).

Figure 15:
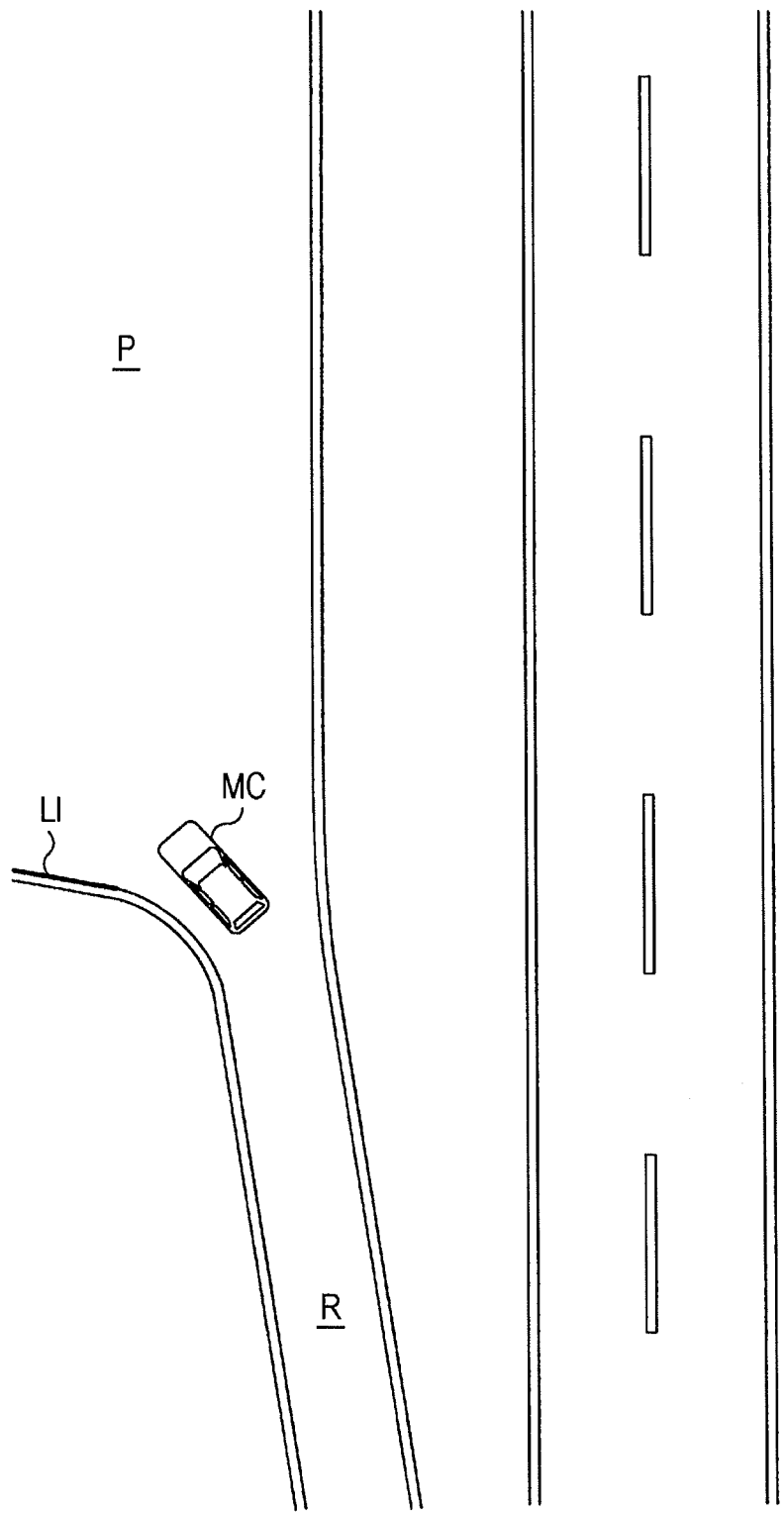
FIG. 15 explains a state in which the vehicle has entered a parking area.

Further, when one or both of the left and right traffic lines Ll and Lr is not detected (Step S21: YES), the control means 8 determines that there is a high possibility that the vehicle MC came out of the ramp R and reached a parking area P, a tollgate, or the exit of an interchange, as shown in FIG. 15, and sets the branch-lane flag F at 3 (Step S22 in FIG. 10).

After setting the branch-lane flag F, as described above, the control means 8 outputs signals for performing various controls on the ACC device A (see FIG. 1) in accordance with the value of the branch-lane flag F.

First, when the branch-lane flag F is 0 (Steps S23, 25, 27: NO), since the vehicle MC is running in an ordinary lane, as shown in FIG. 7, the control means 8 causes the ACC device A to normally operate. For this reason, when the count value of the slower-lane counter Scount exceeds the preset threshold value Sth while the branch-lane flag F is 1 (Step S14 in FIG. 10: YES), the branch-lane flag F is reset to 0 (Step S15). Therefore, even when control is performed so as to prohibit acceleration of the vehicle at the time when the vehicle enters a slower lane, as will be described below, the control is stopped at the time when the count value of the slower-lane counter Scount exceeds the threshold value Sth, and the ACC device A returns into its normal operation.

When the curvature of the road becomes more than or equal to the preset threshold value while the branch-lane flag F is 2 (Step S19: YES), the branch-lane flag F is reset to 0 (Step S20). Therefore, even when the vehicle MC enters a ramp R and control is performed so as to decelerate the vehicle MC, as will be described below, the control is stopped at the time when the curvature of the road becomes more than or equal to the threshold value Sth, the curve restraint mechanism operates, as described above, and the ACC device A returns into its normal operation.

Figure 11:
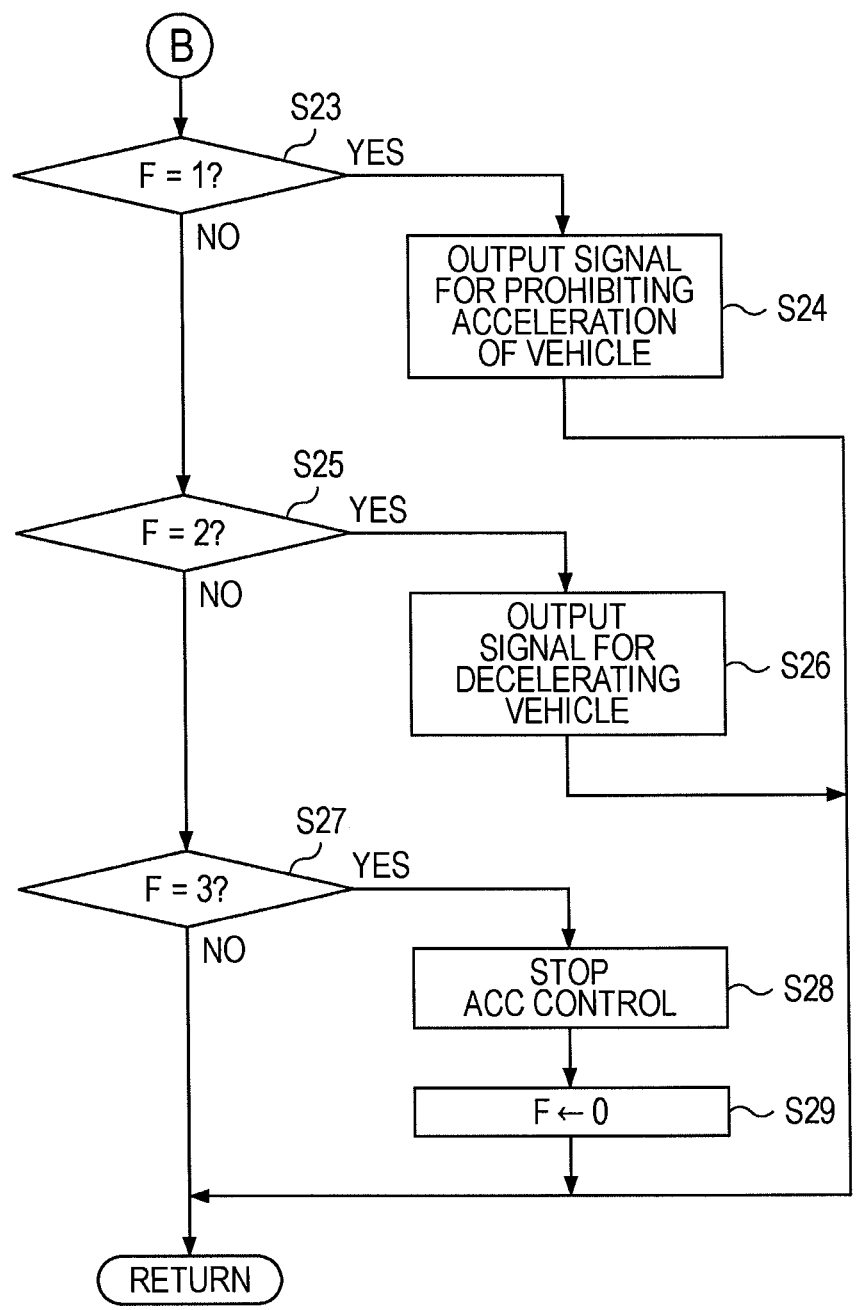
FIG. 11 is a flowchart showing the control procedure performed by the control means in the branch-lane entry judging system.

When the branch-lane flag F is 1 (Step S23 in FIG. 11: YES), that is, when it is determined that the vehicle MC will enter the branch lane B, the control means 8 outputs, to the ACC device A, an acceleration-prohibiting signal for prohibiting acceleration of the vehicle MC (Step S24). The acceleration-prohibiting signal is, for example, a signal for turning the accelerator off. In response to this signal, even when the accelerator pedal is pressed down by the driver, the ACC device A does not accelerate the vehicle MC.

When the branch-lane flag F is 2 (Step S25: YES), that is, at the time when both the left and right traffic lines Ll and Lr become solid lines and it is determined that the vehicle MC has moved from the branch lane B into the ramp R, the control means 8 outputs, to the ACC device A, a deceleration signal for decelerating the vehicle MC (Step S26). The deceleration signal is, for example, a signal that directs the ACC device A to decelerate the vehicle MC at a preset deceleration. In response to this signal, the ACC device A automatically controls the brake mechanism so that the vehicle MC is decelerated at the preset deceleration.

If the branch-lane flag F remains 2 even when a predetermined time passes, the vehicle MC runs by a predetermined distance, or the speed of the vehicle MC falls below a predetermined speed after the control means 8 starts to output the deceleration signal to the ACC device A, the output of the deceleration signal may be stopped, because the vehicle MC has been decelerated sufficiently.

When the branch-lane flag F is 3 (Step S27: YES), that is, at the time when one or both of the left and right traffic lines Ll and Lr are not detected and it is determined that the vehicle MC has passed through the ramp R and reached a parking area, a tollgate, or the exit of an interchange, the control means 8 outputs, to the ACC device A, a signal for stopping ACC control (Step S28), and resets the branch-lane flag F to 0 (Step S29).

Consequently, the deceleration signal, which was output to the ACC device A while the branch-lane flag F was 2, is removed, and all ACC control by the ACC device A is stopped. This is because the driver should properly steer the vehicle MC so as not to collide with a preceding vehicle and so on in the parking area or the tollgate, without performing constant-speed control on the vehicle MC.

While the vehicle running in the leftmost lane on the expressway enters the branch lane on the left side of the road and the ramp, and reaches the parking area, the tollgate, or the exit of the interchange in the above-described embodiment, the present invention is not limited to this case. Similar control can be performed in a freeway and an ordinary road.

A branch lane is sometimes provided on the right side of a freeway or the like. In this case, the branch lane can be detected by detecting that not only a traffic line Ll on the left side of the vehicle, but also a traffic line Lr on the right side of the vehicle changed from a solid line to a block line.

While the embodiment has been described on the assumption that ACC control is performed by the ACC device, even when ACC control is not performed, the branch lane can be detected and control can be performed to prohibit acceleration of the vehicle when the vehicle enters the branch lane and to decelerate the vehicle when the vehicle enters the ramp, in a manner similar to that adopted in the embodiment.

As described above, according to the branch-lane entry judging system 1 of this embodiment, the lengths and widths of traffic lines on the right and left sides of the vehicle are detected. When one of the traffic lines changes from a solid line to a block line, it is detected that a branch lane exists near the changed traffic line. This allows the existence of a branch lane to be detected accurately.

After the existence of the branch lane is accurately detected, when the vehicle moves toward the branch lane or the directional indicator is turned toward the branch lane, it is judged that the vehicle will enter the branch lane. Therefore, it is possible to accurately judge whether the vehicle will enter the branch lane.

Since the branch lane can be accurately detected and the entry into the branch lane can be accurately judged, as described above, it is possible to properly prohibit acceleration of the vehicle and to properly decelerate the vehicle in the ramp. This allows stable running of the vehicle, and improves driving safety of the vehicle.

When the branch-lane entry judging system 1 has the preceding-vehicle detecting means 7, as in this embodiment, the ACC device A automatically performs control so that the vehicle follows the preceding vehicle, on the basis of information about the speed of the preceding vehicle and the distance between the vehicle and the preceding vehicle transmitted from the control means 8. In this case, when a signal for prohibiting acceleration of the vehicle or a signal for decelerating the vehicle is transmitted from the control means 8, the ACC device A has two standards for determining the deceleration of the vehicle, that is, a standard based on the signal and a standard based on the information about the speed and distance of the preceding vehicle.

In this case, both decelerations are compared, and control can be performed while giving priority to the deceleration having a larger absolute value, that is, a deceleration for performing stronger deceleration. This can prevent, for example, a collision with the preceding vehicle.

When a preceding vehicle is detected, the ACC device A can perform ACC control so that the vehicle follows the preceding vehicle, without performing the control according to this embodiment. This can properly prevent, for example, a collision with the preceding vehicle.

When the driver of the vehicle operates the directional indicator in a direction opposite the branch lane, the control can be returned to ACC control by the ACC device A, particularly, to constant-speed running control on the vehicle. In this case, when the driver erroneously causes the vehicle to enter the branch lane or returns the vehicle from a slower lane to an ordinary lane, control, such as prohibiting acceleration of the vehicle, can be properly stopped, and ACC control can be performed properly.

What is claimed is:

1. A branch-lane entry judging system comprising:
   traffic-line detecting means configured to detect traffic lines on right and left sides of a vehicle;
   length and width detecting means configured to detect lengths and widths, in a traveling direction of the vehicle on a real space, of the traffic lines detected by the traffic-line detecting means;
   lane-type judging means configured to judge types of the traffic lines and judge a type of a lane in which the vehicle is running, on the basis of a result of detection performed by the length and width detecting means;
   branch-lane detecting means configured to detect the existence of a branch lane when detecting, on the basis of the result of detection performed by the length and width detecting means, that one of the traffic lines changes from a solid line to a broken line having a predetermined length and a predetermined width, the branch lane existing near the changed traffic line;
   branch-lane entry judging means configured to judge that the vehicle will enter the branch lane when the vehicle moves toward the branch lane, or when a directional indicator is operated toward the branch lane;
   control means configured to output a deceleration signal for decelerating the vehicle when:
      the length and width detecting means detects that both the traffic lines on the right and left sides of the vehicle have changed to solid lines,
      while a predetermined time passes or while the vehicle runs by a predetermined distance,
      after the branch-lane entry judging means judges that the vehicle will enter the branch lane; and
   history holding means configured to hold a sampling period history, said history including data representative of a traffic line status in a previous sampling period,
      wherein the system is configured to judge, with reference to the history held by the history holding means, that the one of the traffic lines changes from a solid line to a broken line.

2. The branch-lane entry judging system according to claim 1, wherein the control means is configured to output an acceleration-prohibiting signal for prohibiting acceleration of the vehicle when the branch-lane entry judging means judges that the vehicle will enter the branch lane.

3. The branch-lane entry judging system according to claim 1, wherein the control means is configured to stop output of the deceleration signal when at least one of the traffic lines on the right and left sides of the vehicle is not detected by the length and width detecting means after the output of the deceleration signal starts.

4. The branch-lane entry judging system according to claim 1, wherein the control means is configured to stop output of the deceleration signal when:
   a predetermined time passes,
   the vehicle runs by a predetermined distance, or
   a speed of the vehicle falls below a predetermined speed,
   after the output of the deceleration signal starts.

5. The branch-lane entry judging system according to claim 3, wherein the control means is configured to output a signal for stopping a constant-speed running control of the vehicle when the output of the deceleration signal is stopped.

6. The branch-lane entry judging system according to claim 4, wherein the control means is configured to output a signal for stopping a constant-speed running control of the vehicle when the output of the deceleration signal is stopped.

7. The branch-lane entry judging system according to claim 1, wherein the control means is configured to stop output of the deceleration signal when a curvature of a road becomes more than or equal to a predetermined curvature after the length and width detecting means detects that both the traffic lines on the right and left sides of the vehicle have changed to solid lines.

8. The branch-lane entry judging system according to claim 2, wherein the control means is configured to stop output of the acceleration-prohibiting signal when the length and width detecting means detects:
   that the one of the traffic lines is a broken line having the predetermined length and the predetermined width,
   while a predetermined time passes or the vehicle runs by a predetermined distance,
   after the branch-lane entry judging means judges that the vehicle will enter the branch lane.

9. The branch-lane entry judging system according to claim 7, wherein the control means is configured to output a signal for a constant-speed running control of the vehicle when the output of the deceleration signal or an acceleration-prohibiting signal is stopped.

10. A branch-lane entry judging system comprising:
    traffic-line detecting means configured to detect traffic lines on right and left sides of a vehicle;

length and width detecting means configured to detect lengths and widths, in a traveling direction of the vehicle on a real space, of the traffic lines detected by the traffic-line detecting means;

lane-type judging means configured to judge types of the traffic lines and judge a type of a lane in which the vehicle is running, on the basis of a result of detection performed by the length and width detecting means;

branch-lane detecting means configured to detect the existence of a branch lane when detecting, on the basis of the result of detection performed by the length and width detecting means, that one of the traffic lines changes from a solid line to a broken line having a predetermined length and a predetermined width, the branch lane existing near the changed traffic line;

branch-lane entry judging means configured to judge that the vehicle will enter the branch lane when the vehicle moves toward the branch lane, or when a directional indicator is operated toward the branch lane;

control means configured to output an acceleration-prohibiting signal for prohibiting acceleration of the vehicle when the branch-lane entry judging means judges that the vehicle will enter the branch lane; and history holding means configured to hold a sampling period history, said history including data representative of a traffic line status in a previous sampling period, wherein the system is configured to judge, with reference to the history held by the history holding means, that the one of the traffic lines changes from a solid line to a broken line, the control means is configured to stop output of the acceleration-prohibiting signal when:
the length and width detecting means detects that the one of the traffic lines is a broken line having the predetermined length and the predetermined width,
while a predetermined time passes or the vehicle runs by a predetermined distance,
after the branch-lane entry judging means judges that the vehicle will enter the branch lane, and the control means is configured to output a signal for a constant-speed running control of the vehicle when the output of a deceleration signal or the acceleration-prohibiting signal is stopped.

11. The branch-lane entry judging system according to claim 2, further comprising:

preceding-vehicle detecting means configured to detect a preceding vehicle, wherein the control means is configured such that when the acceleration-prohibiting signal or the deceleration signal is output by the control means, a deceleration calculated from a speed of the preceding vehicle and a distance between the vehicle and the preceding vehicle detected by the preceding-vehicle detecting means is output, and the control means is configured to compare the output deceleration and a deceleration based on the acceleration-prohibiting signal or the deceleration signal, and to perform control while giving priority to the deceleration, of the compared decelerations, having a larger absolute value.

12. The branch-lane entry judging system according to claim 1, further comprising:

preceding-vehicle detecting means configured to detect a preceding vehicle, wherein the control means is configured such that when an acceleration-prohibiting signal or the deceleration signal is output by the control means, a deceleration calculated from a speed of the preceding vehicle and a distance between the vehicle and the preceding vehicle detected by the preceding-vehicle detecting means is output, and the control means is configured to compare the output deceleration and a deceleration based on the acceleration-prohibiting signal or the deceleration signal, and perform control while giving priority to the deceleration having a larger absolute value.

13. The branch-lane entry judging system according to claim 2, further comprising:

preceding-vehicle detecting means configured to detect a preceding vehicle, wherein, the control means is configured such that when the preceding vehicle is detected by the preceding-vehicle detecting means, the control means outputs a signal for a preceding-vehicle follow control so that the vehicle follows the preceding vehicle.

14. The branch-lane entry judging system according to claim 1, further comprising:

preceding-vehicle detecting means configured to detect a preceding vehicle, wherein, the control means is configured such that when the preceding vehicle is detected by the preceding-vehicle detecting means, the control means outputs a signal for a preceding-vehicle follow control so that the vehicle follows the preceding vehicle.

15. A branch-lane entry judging system comprising:

traffic-line detecting means configured to detect traffic lines on right and left sides of a vehicle;

length and width detecting means configured to detect lengths and widths, in a traveling direction of the vehicle on a real space, of the traffic lines detected by the traffic-line detecting means;

lane-type judging means configured to judge types of the traffic lines and judge a type of a lane in which the vehicle is running, on the basis of a result of detection performed by the length and width detecting means;

branch-lane detecting means configured to detect the existence of a branch lane when detecting, on the basis of the result of detection performed by the length and width detecting means, that one of the traffic lines changes from a solid line to a broken line having a predetermined length and a predetermined width, the branch lane existing near the changed traffic line;

branch-lane entry judging means configured to judge that the vehicle will enter the branch lane when the vehicle moves toward the branch lane, or when a directional indicator is operated toward the branch lane;

control means configured to output an acceleration-prohibiting signal for prohibiting acceleration of the vehicle when the branch-lane entry judging means judges that the vehicle will enter the branch lane; and history holding means configured to hold a sampling period history, said history including data representative of a traffic line status in a previous sampling period, wherein the system is configured to judge, with reference to the history held by the history holding means, that the one of the traffic lines changes from a solid line to a broken line, and the control means is configured to output a signal for a constant-speed running control of the vehicle when the directional indicator is operated in a direction opposite the branch lane.

16. The branch-lane entry judging system according to claim 1, wherein, the control means is configured to output a signal for a constant-speed running control of the vehicle when the directional indicator is operated in a direction opposite the branch lane.

17. A branch-lane entry judging system comprising:
traffic-line detecting means configured to detect traffic lines on right and left sides of a vehicle;
length and width detecting means configured to detect lengths and widths, in a traveling direction of the vehicle, on a real space, of the traffic lines detected by the traffic-line detecting means;
lane-type judging means configured to judge types of the traffic lines and judge a type of a lane in which the vehicle is running, on the basis of a result of detection performed by the length and width detecting means;
history holding means configured to hold a sampling period history, said history including data representative of a traffic line status in a previous sampling period;
branch-lane detecting means configured to detect the existence of a branch lane when detecting that one of the traffic lines changes from a solid line to a broken line having a predetermined length and a predetermined width by reference to the history held by the history holding means, the branch lane existing near the changed traffic line; and
branch-lane entry judging means configured to judge that the vehicle will enter the branch lane when the vehicle moves toward the branch lane, or when a directional indicator is operated toward the branch lane.

18. The branch-lane entry judging system according to claim 1, wherein, the branch-lane entry judging means is configured to judge that the vehicle will enter the branch lane when the vehicle moves toward the branch lane, or when a directional indicator is operated toward the branch lane, while the branch-lane detecting means is detecting the branch lane.

19. The branch-lane entry judging system according to claim 10, wherein, the branch-lane entry judging means is configured to judge that the vehicle will enter the branch lane when the vehicle moves toward the branch lane, or when a directional indicator is operated toward the branch lane, while the branch-lane detecting means is detecting the branch lane.

20. The branch-lane entry judging system according to claim 15, wherein, the branch-lane entry judging means is configured to judge that the vehicle will enter the branch lane when the vehicle moves toward the branch lane, or when a directional indicator is operated toward the branch lane, while the branch-lane detecting means is detecting the branch lane.

21. The branch-lane entry judging system according to claim 17, wherein, the branch-lane entry judging means is configured to judge that the vehicle will enter the branch lane when the vehicle moves toward the branch lane, or when a directional indicator is operated toward the branch lane, while the branch-lane detecting means is detecting the branch lane.

22. The branch-lane entry judging system according to claim 15, wherein the control means is configured such that,
after a constant-speed running control of the vehicle is stopped due to a judgment that the vehicle will enter the branch lane, and
after a directional indicator is operated in a direction opposite the branch lane, the control means outputs a signal to return the vehicle to the constant-speed running control.

23. The branch-lane entry judging system according to claim 16, wherein the control means is configured such that,
after a constant-speed running control of the vehicle is stopped due to a judgment that the vehicle will enter the branch lane, and
after a directional indicator is operated in a direction opposite the branch lane, the control means outputs a signal to return the vehicle to the constant-speed running control.

* * * * *